United States Patent
Vetters et al.

(10) Patent No.: US 9,587,517 B2
(45) Date of Patent: Mar. 7, 2017

(54) BLADE TRACK ASSEMBLY WITH TURBINE TIP CLEARANCE CONTROL

(71) Applicants: Rolls-Royce North American Technologies, Inc., Indianapolis, IN (US); Rolls-Royce High Temperature Composites Inc., Huntington Beach, CA (US)

(72) Inventors: Daniel K. Vetters, Indianapolis, IN (US); Joseph Doyle, Fountain Valley, CA (US); Michael Jacquinto, Long Beach, CA (US); Wesley Thibault, Santa Monica, CA (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 14/950,776

(22) Filed: Nov. 24, 2015

(65) Prior Publication Data

US 2016/0186611 A1    Jun. 30, 2016

Related U.S. Application Data

(60) Provisional application No. 62/097,345, filed on Dec. 29, 2014.

(51) Int. Cl.
| | |
|---|---|
| F01D 11/18 | (2006.01) |
| F01D 25/24 | (2006.01) |
| F01D 11/08 | (2006.01) |
| F01D 9/04 | (2006.01) |
| F01D 11/24 | (2006.01) |

(52) U.S. Cl.
CPC ............. *F01D 25/246* (2013.01); *F01D 9/04* (2013.01); *F01D 11/08* (2013.01); *F01D 11/18* (2013.01); *F01D 11/24* (2013.01); *F05D 2220/32* (2013.01); *F05D 2230/60* (2013.01); *F05D 2230/64* (2013.01); *F05D 2230/642* (2013.01);

(Continued)

(58) Field of Classification Search
CPC .......... F01D 11/18; F01D 11/20; F01D 11/22
See application file for complete search history.

(56) References Cited

U.S. PATENT DOCUMENTS

| 6,514,041 B1 * | 2/2003 | Matheny | ............... F01D 25/246 |
| | | | 415/177 |
| 7,278,820 B2 | 10/2007 | Keller | |

(Continued)

FOREIGN PATENT DOCUMENTS

| GB | 2068470 A | 8/1981 |
| GB | 2235732 A | 3/1991 |

OTHER PUBLICATIONS

Extended European Search Report, European Application No. 15200571.6-1610 / 3043032, dated Jun. 15, 2016, 8 pages.

(Continued)

*Primary Examiner* — Woody Lee, Jr.
(74) *Attorney, Agent, or Firm* — Barnes & Thornburg LLP (57) ABSTRACT

A turbine shroud assembly or blade track assembly adapted to extend around a turbine wheel assembly is disclosed. The turbine shroud assembly includes a carrier and a blade track coupled to the carrier. The blade track is movable between a radially-inward position having a first inner diameter and a radially-outward position having a second inner diameter larger than the first inner diameter.

19 Claims, 8 Drawing Sheets

(52) U.S. Cl.
CPC .... *F05D 2240/11* (2013.01); *F05D 2240/307* (2013.01); *F05D 2250/38* (2013.01)

(56) References Cited

U.S. PATENT DOCUMENTS

| | | |
|---|---|---|
| 7,556,475 B2 | 7/2009 | Roberts, III et al. |
| 7,563,071 B2 | 7/2009 | Campbell et al. |
| 7,722,317 B2 | 5/2010 | Schiavo et al. |
| 7,726,936 B2 | 6/2010 | Keller et al. |
| 7,950,234 B2 | 5/2011 | Radonovich et al. |
| 8,118,546 B2 * | 2/2012 | Morrison |
| 2004/0047726 A1 * | 3/2004 | Morrison ................ F01D 9/04 415/116 |
| 2010/0034645 A1 * | 2/2010 | Mulcaire ................ F01D 11/24 415/173.3 |
| 2010/0247298 A1 * | 9/2010 | Nakamura ............. F01D 11/18 415/173.1 |
| 2014/0271147 A1 * | 9/2014 | Uskert .................... F01D 11/24 415/173.2 |

OTHER PUBLICATIONS

Corman, Gregory and Luthra, Krishan, Melt Infiltrated Ceramic Composites (Hipercomp®) for Gas Turbine Engine Applications, Jan. 2006, (507 pages).

Corman, Gregory, Melt Infiltrated Ceramic Matrix Composites for Shrouds and Combustor Liners of Advanced Industrial Gas Turbines, Dec. 2010, (511 pages).

Extended European Search Report for EP Application Serial No. 15200571.6, completed Jun. 16, 2015, (8 Pages).

* cited by examiner

BLADE TRACK ASSEMBLY WITH TURBINE TIP CLEARANCE CONTROL

CROSS REFERENCE TO RELATED APPLICATIONS

This application claims priority to and the benefit of U.S. Provisional Patent Application No. 62/097,345, filed 29 Dec. 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in shrouds that are arranged around the rotating wheel assemblies.

During operation, the tips of the blades included in the rotating wheel assemblies typically move inwardly and outwardly relative to a centerline of the engine due to changes in centrifugal force and temperatures experienced by the blades. Because of this movement, turbine shrouds are often designed to allow clearance between the blade tips and the blade tracks. This clearance may allow combustion products to pass over the blades without pushing the blades, thereby contributing to lost performance within a gas turbine engine. In some designs, the blade tips contact the blade tracks arranged around the rotating wheel assemblies and cut grooves into the blade tracks, further contributing to lost performance within a gas turbine engine.

SUMMARY

The present disclosure may comprise one or more of the following features and combinations thereof.

A turbine shroud assembly for a gas turbine engine may include a carrier, a blade track, and a plurality of guide pins. The carrier may be configured to change size in response to a change in temperature, and the carrier may be arranged around an engine axis to form a ring. The carrier may be formed to include a plurality of guide slots extending perpendicular to the engine axis. The blade track may be concentric with the carrier, and the blade track may be made of a plurality of segments. The blade track may be movable between a radially-inward position having a first inner diameter and a radially-outward position having a second inner diameter larger than the first inner diameter. The plurality of guide pins may be positioned in the guide slots, and the plurality of guide pins may be attached to the segments of the blade track to couple the carrier to the blade track. The guide pins may be movable within the guide slots so that the segments of the blade track each move substantially inwardly and outwardly in a radial direction relative to the engine axis as the blade track moves between the radially-inward position and the radially-outward position.

In some embodiments, the guide slots may extend substantially only in the radial direction. Additionally, in some embodiments, the plurality of segments of the blade track may include a plurality of segments formed from ceramic matrix composite material, and the carrier may include a plurality of metallic carrier segments.

In some embodiments, the carrier may be further formed to include (i) a plurality of first mover slots each circumferentially spaced clockwise from corresponding guide slots and (ii) a plurality of second mover slots each circumferentially spaced counterclockwise from corresponding guide slots. The carrier may include a plurality of carrier segments, and at least one of the plurality of carrier segments may be formed to include a guide slot, a first mover slot, and a second mover slot. Additionally, in some embodiments, (i) each of the first mover slots may extend along a first mover axis, (ii) each of the second mover slots may extend along a second mover axis, and (iii) the first mover axis and the second mover axis may intersect at a point arranged radially outward of the guide slots. In some embodiments still, (i) each of the first mover slots may extend along a first mover axis, (ii) each of the second mover slots may extend along a second mover axis, and (iii) the first mover axis and the second mover axis may intersect at a point arranged radially inward of the guide slots. Additionally, in other embodiments, (i) each of the first mover slots may extend along a first cam path, (ii) each of the second mover slots may extend along a second cam path, and (iii) the first cam path may mirror a corresponding second cam path when viewed about a corresponding guide axis. In other embodiments still, the turbine shroud assembly may further include (i) plurality of first mover pins positioned in the first mover slots and attached to segments of the blade track to couple the carrier to the segments of the blade track, and (ii) a plurality of second mover pins positioned in the second mover slots and attached to the segments of the blade track to couple the carrier to the segments of the blade track. The first and second movers pins may move together within their respective mover slots in response to expansion and contraction of the carrier to move the segments of the blade track inwardly and outwardly in the radial direction. Corresponding first and second mover pins may be equidistant from a corresponding guide pin as corresponding first and second mover pins move within their respective mover slots.

According to another aspect of the present disclosure, a turbine shroud assembly for a gas turbine engine may include a carrier, a blade track, and a plurality of fasteners. The carrier may be configured to change size in response to a change in temperature, and the carrier may be arranged around an engine axis to form a ring. The carrier may include a plurality of carrier segments each having (i) a guide slot extending perpendicular to the engine axis, (ii) a first mover slot circumferentially spaced a first distance from the guide slot, and (iii) a second mover slot circumferentially spaced a second distance equal to the first distance from the guide slot. The blade track may be concentric with the carrier, and the blade track may be made of a plurality of segments. The plurality of fasteners may be attached to the segments of the blade track and the carrier segments to couple the segments of the blade track to the carrier segments. One of the plurality of fasteners may be positioned in each of the guide slot, the first mover slot, and the second mover slot of each carrier segment. The fasteners positioned in the respective slots of each carrier segment may be movable together in their respective slots in response to a change in size of the carrier to cause the plurality of segments of the blade track to move inwardly and outwardly in a radial direction relative to the engine axis.

In some embodiments, each of the carrier segments may be symmetrical about a guide axis defined by the guide slot. Additionally, in some embodiments, the plurality of segments of the blade track may include a plurality of segments formed from ceramic matrix composite material, and the plurality of carrier segments of the carrier may include a plurality of metallic carrier segments.

In some embodiments, the first mover slot may be circumferentially spaced clockwise from the guide slot of each carrier segment, and the second mover slot may be circumferentially spaced counterclockwise from the guide slot of each carrier segment. Each of the first mover slots may extend along a first mover axis, each of the second mover slots may extend along a second mover axis, and the first mover axis and the second mover axis may intersect at a point arranged radially outward of each of the guide slots. Additionally, in some embodiments, (i) each of the first mover slots may extend along a first mover axis, (ii) each of the second mover slots may extend along a second mover axis, and (iii) the first mover axis and the second mover axis may intersect at a point arranged radially inward of each of the guide slots. Additionally, in some embodiments still, (i) each of the first mover slots may extend along a first arc, (ii) each of the second mover slots may extend along a second arc, and (iii) the first arc may mirror the second arc when viewed about a guide axis defined by the guide slot of each carrier segment.

According to yet another aspect of the present disclosure, a method of coupling a carrier of a turbine shroud assembly of a gas turbine engine to a blade track of the turbine shroud assembly may include arranging the carrier concentric with the blade track about an engine axis of the gas turbine engine so that the carrier extends around the engine axis to surround the blade track, and coupling the carrier to the blade track to resist movement of the blade track relative to the carrier around the engine axis and allow movement of the blade track relative to the carrier in a radial direction relative to the engine axis.

In some embodiments, (i) at least one carrier segment of the carrier may be formed to include a guide slot extending substantially only in the radial direction, (ii) at least one blade track segment of the blade track may be formed to include an aperture, and (iii) coupling the carrier to the blade track may include coupling the at least one carrier segment of the carrier to the at least one blade track segment of the blade track by inserting a fastener through the guide slot and the aperture. Additionally, (i) the at least one carrier segment of the carrier may be formed to include a first mover slot circumferentially spaced clockwise from the guide slot and a second mover slot circumferentially spaced counterclockwise from the guide slot so that the at least one carrier segment is symmetrical about the guide slot, (ii) the at least one blade track segment may be formed to include a second aperture and a third aperture, and (iii) coupling the carrier to the blade track may include coupling the at least one carrier segment of the carrier to the at least one blade track segment of the blade track by inserting fasteners through the first mover slot and the second aperture and also through the second mover slot and the third aperture.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
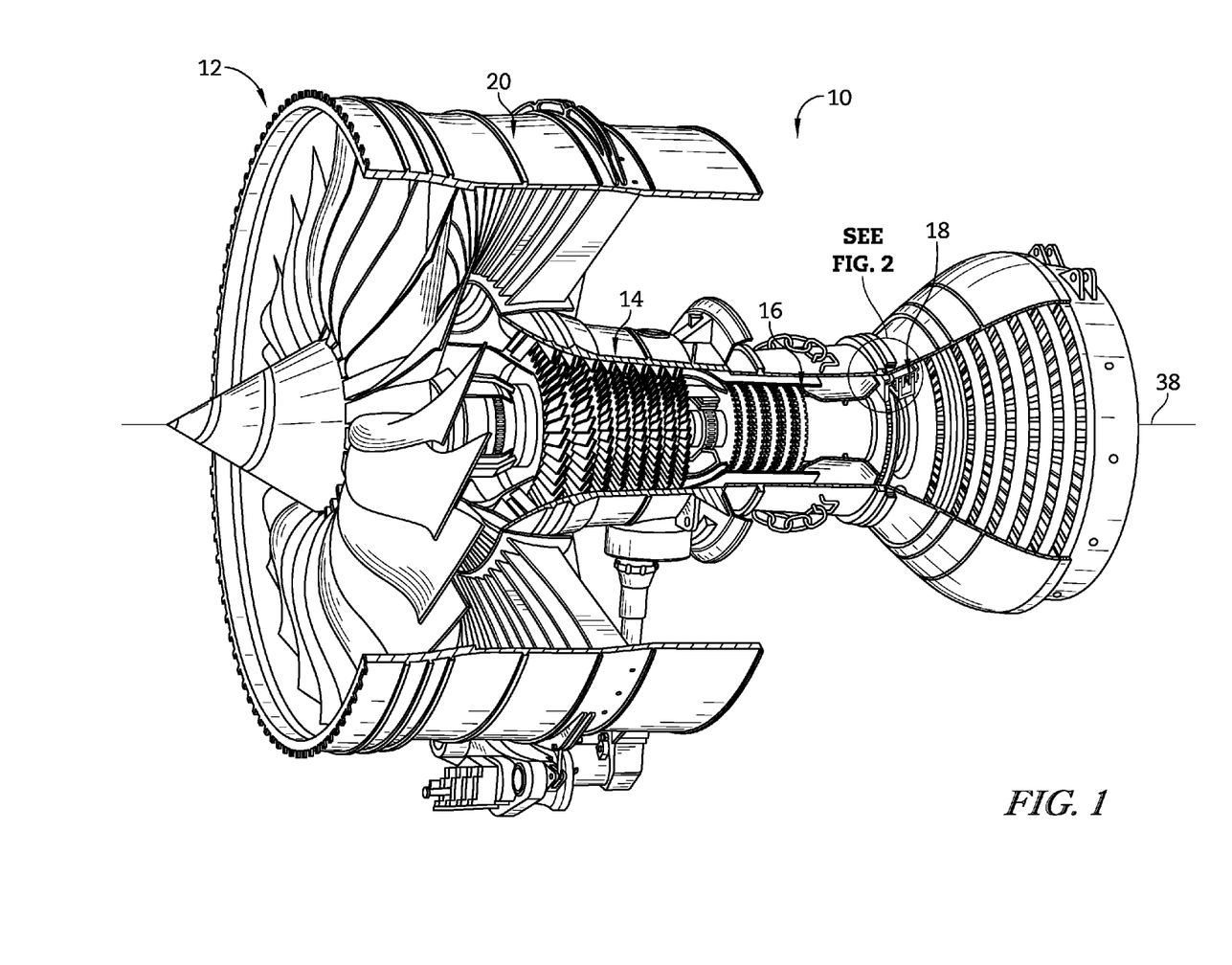
FIG. 1 is a cut-away perspective view of a gas turbine engine.

Referring now to FIG. 1, an illustrative aerospace gas turbine engine 10 is cut-away to show that the engine 10 includes a fan 12, a compressor 14, a combustor 16, and a turbine 18 all mounted to a case 20. The fan 12 is driven by the turbine 18 to provide thrust. The compressor 14 compresses and delivers air to the combustor 16. The combustor 16 mixes fuel with the compressed air received from the compressor 14 and ignites the fuel to produce hot, high-pressures gas. The hot, high-pressure gas produced from burning fuel in the combustor 16 is directed into the turbine 18, and the turbine 18 extracts work to drive the compressor 14 and the fan 12.

Figure 2:
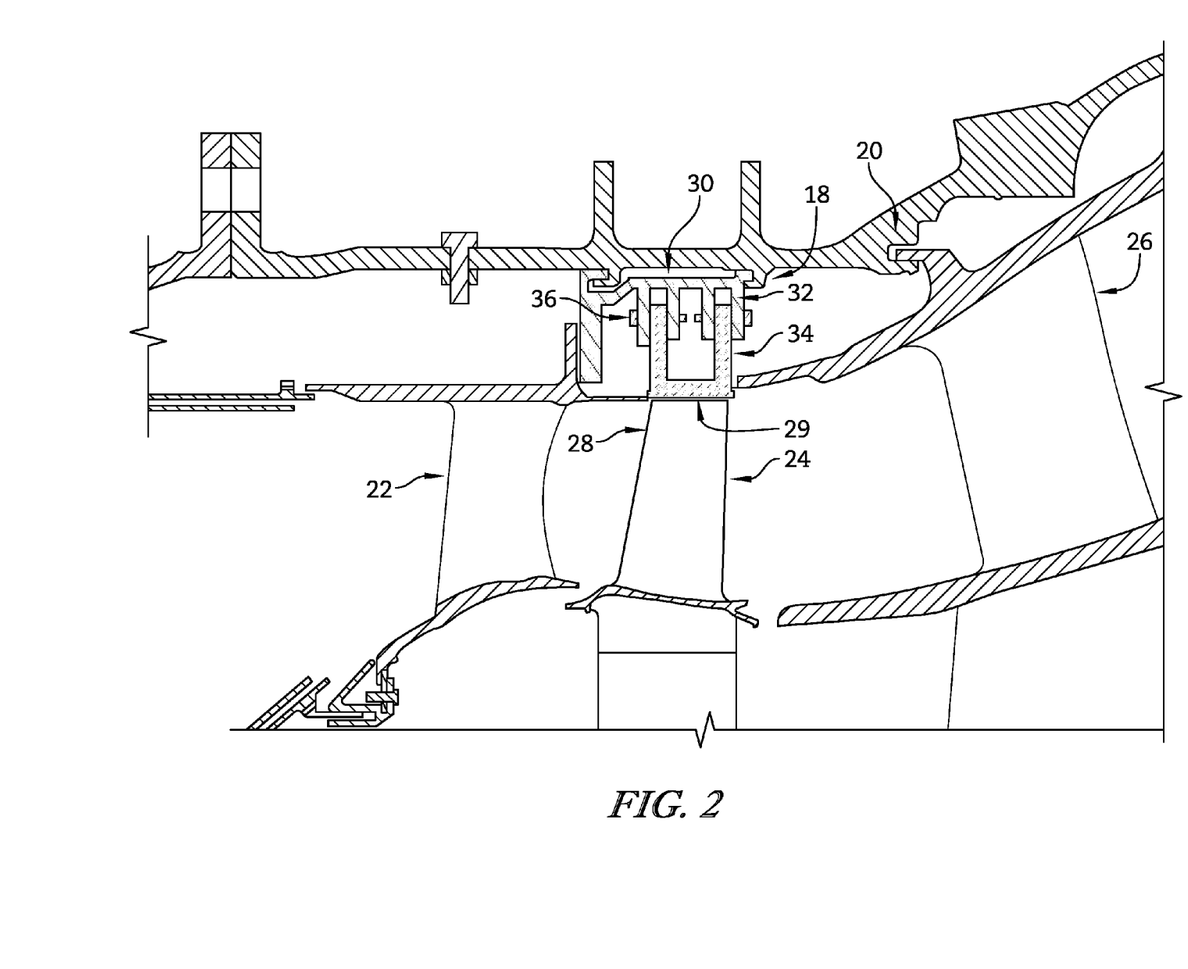
FIG. 2 is a cross-sectional view of a turbine of the gas turbine engine of FIG. 1 showing that the turbine includes a turbine wheel assembly and a turbine shroud extending around the turbine wheel assembly.

Referring now to FIG. 2, the turbine 18 illustratively includes a first static vane assembly 22, a first turbine wheel assembly 24, and a second static vane assembly 26. The first static vane assembly 22 extends across the flow path of the hot, high-pressure gas from the combustor 16 to direct the gas toward blades 28 included in the first turbine wheel assembly 24. The blades 28 are in turn pushed by the combustion products to cause the first turbine wheel assembly 24 to rotate; thereby, driving the rotating components of the compressor 14 and the fan 12.

The turbine 18 includes a turbine shroud assembly 30 having a blade track 34 that extends around the first turbine wheel assembly 24 to block combustion products from passing over tips 29 of the blades 28 without pushing the blades 28 to rotate as shown in FIG. 2. The illustrative turbine shroud assembly 30 is adjustable to control the amount of blade tip clearance between the tips 29 of the blades 28 and the blade track 34 included in the turbine shroud assembly 30. Thus, the amount of hot, high-pressure gas that passes over the tips 29 of the blades 28 without pushing the blades 28 to rotate can be managed as the turbine shroud assembly 30 expands and contracts during operation of the gas turbine engine 10. In some instances, the clearance between the tips 29 of the blades 28 and the blade track 34 may be controlled to a particular value when changes in temperature are experienced by the turbine shroud assembly 30. In other instances, the clearance between the tips 29 of the blades 28 and the blade track 34 may be controlled to multiple values, e.g., a particular range of values, when changes in temperature are experienced by the turbine shroud assembly 30.

Figure 3:
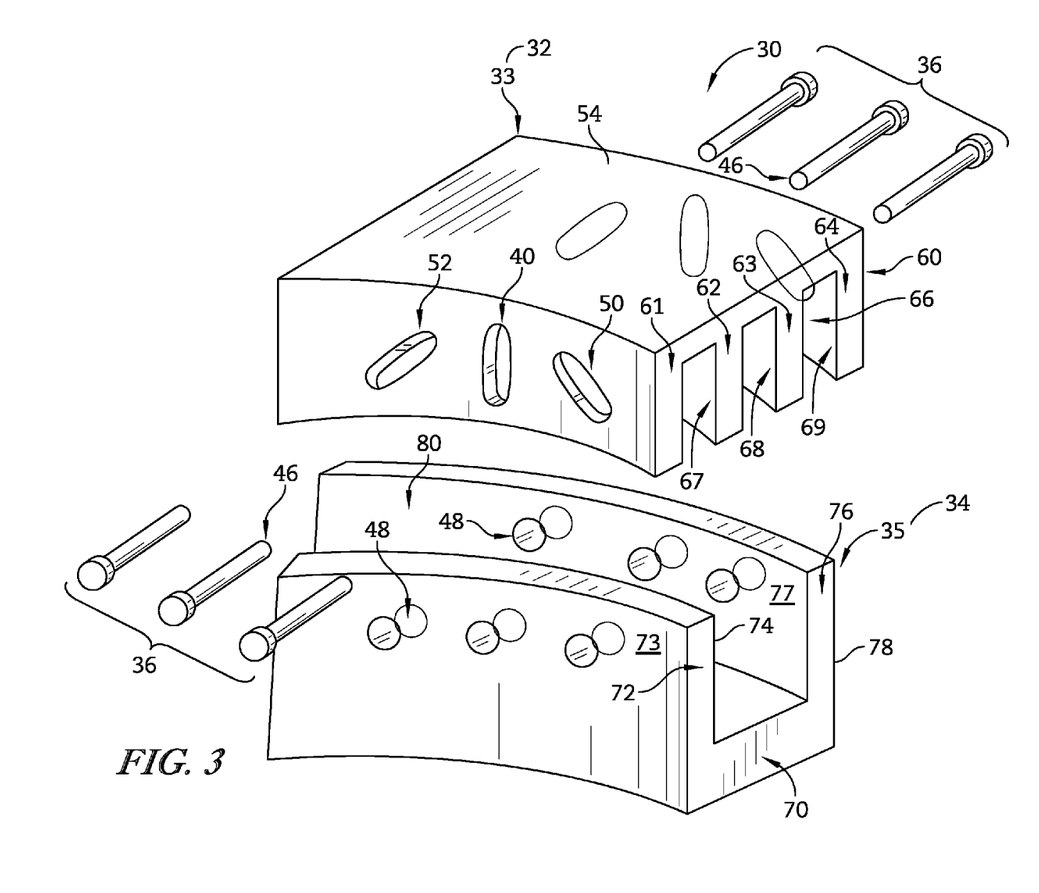
FIG. 3 is an assembly view of a portion of the turbine shroud of FIG. 2 showing that the turbine shroud includes a blade track made of a plurality of blade track segments, a carrier made of a plurality of carrier segments, and a plurality of fasteners used to couple the blade track segments to the carrier segments.

The turbine shroud assembly 30 includes a carrier 32, the blade track 34, and a plurality of fasteners 36 used to couple the carrier 32 to the blade track 34 as shown, for example, in FIGS. 2 and 3. The carrier 32 is coupled to the case 20 and configured to support the blade track 34 in position adjacent the blades 28 of the first turbine wheel assembly 24. The carrier 32 is configured to change size in response to a change in temperature during operation of the gas turbine engine 10. As the carrier 32 changes size circumferentially relative to the blade track 34, the inner diameter of the blade track 34 relative to an engine axis 38 of the engine 10 is adjusted to control the amount of tip clearance between the tips 29 of the blades 28 and the blade track 34.

The carrier 32 is illustratively made of a plurality of carrier segments 33 (one of which is shown in FIG. 3) circumferentially arranged adjacent one another around the engine axis 38 to form a ring. In some embodiments, the carrier 32 may be a one-piece, monolithic component rather than a number of segments. Each carrier segment 33 is formed to include a plurality of guide slots 40 extending perpendicular to the engine axis 38. The blade track 34 is concentric with the carrier 32 and made of a plurality of blade track segments 35 (one of which is also shown in FIG. 3). During operation of the engine 10, the blade track 34 moves relative to the carrier 32 as indicated above to adjust the inner diameter of the blade track 34. Specifically, the blade track 34 moves between a radially-inward position 42 in which the blade track 34 has a first inner diameter (shown in FIG. 8) and a radially-outward position 44 in which the blade track 34 has a second inner diameter (shown in FIG. 9) larger than the first inner diameter.

The plurality of fasteners 36 include a plurality of guide pins 46 positioned in the guide slots 40 and attached to each blade track segment 35 to couple the carrier segments 33 to the blade track segments 35 as indicated above. The guide pins 46 move within the guide slots 40 of each segment 33 so that the segments 35 each move substantially inwardly and outwardly in a radial direction relative to the engine axis 38 as the blade track 34 moves between the positions 42, 44.

Referring now to FIG. 3, an assembly view of a portion of the turbine shroud assembly 30 is shown. Each segment 35 of the blade track 34 is illustratively formed to include six apertures 48 sized to receive the fasteners 36. Each segment 33 of the carrier 32 is illustratively formed to include two guide slots 40, two first mover slots 50, and two second mover slots 52 sized to receive the fasteners 36.

The carrier 32 is illustratively made of metallic material, and each of the carrier segments 33 is illustratively a metallic segment. The metallic material may be a nickel-based or cobalt-based alloy selected based on the coefficient of thermal expansion of the material to provide a specific amount of expansion and contraction across a temperature range corresponding to a subset of engine operating temperatures. In the illustrative embodiments, as described above, the carrier 32 is segmented (i.e., formed from the segments 33) and is attached to the metallic case 20. In operation of the engine 10, the carrier 32 may passively follow the thermal growth of the case 20. In some embodiments, the thermal growth of the case 20 may be thermally managed to control the thermal growth of the carrier 32, and thus the tip clearance between the blades 28 and the blade track 34 (i.e., as the guide pins 46 move within the guide slots 40). In some embodiments still, the carrier 32 may be segmented (i.e., formed from the segments 33) and mounted to an actuator system that may be used to actively control the radial position of each of the segments 33 relative to the axis 38.

In other embodiments, in operation of the engine 10, the thermal growth of the case 20 and the segmented carrier 32 may be managed separately. For instance, one cooling system may be dedicated to managing the thermal growth of the case 20, and another cooling system may be dedicated to managing the thermal growth of the carrier 32 during operating of the engine 10. Because the clearance between the blades 28 and the blade track 34 is adjusted as the carrier 32 changes size circumferentially relative to the blade track 34, the cooling system dedicated to managing the thermal growth of the carrier 32 may dictate the blade tip clearance.

In other embodiments still, the carrier 32 may be a one-piece component, i.e., a full hoop carrier 32. The full hoop carrier 32 may be cross-keyed in place to ensure the carrier 32 is centered about the axis 38. In such embodiments, in operation of the engine 10, the thermal growth of the carrier 32 may be thermally managed directly to control the thermal growth of the carrier 32, and thus the tip clearance between the blades 28 and the blade track 34 (i.e., as the guide pins 46 move within the guide slots 40).

Each carrier segment 33 of the carrier 32 illustratively includes an arcuate wall 54 that extends a portion of the way around the axis 38 as shown in FIG. 3. The legs 60 define a plurality of channels 66 therebetween. Illustratively, the plurality of legs 60 includes four legs 61, 62, 63, 64 that cooperate to define three channels 66 therebetween (i.e., channels 67, 68, 69 as discussed below). In other embodiments, the plurality of legs 60 may include more or less than four legs 66 that define more or less than three channels 66 therebetween. The guide slots 40, the first mover slots 50, and the second mover slots 52 illustratively extend through the legs 60 in the axial direction as shown in FIG. 3.

The blade track 34 is illustratively made of a ceramic matrix composite material, and each of the blade track segments 35 comprises a ceramic matrix composite material. In one example, the ceramic matrix composite material may include silicon-carbide fiber reinforcements suspended in a silicon-carbide matrix. In another example, the ceramic matrix composite material may include another ceramic-based material that includes reinforcing fibers and a matrix material. In other embodiments, the blade track 34 and blade track segments 35 may be made of other monolithic ceramic, metallic, non-metallic, or composite materials.

Each blade track segment 35 of the blade track 34 illustratively includes a body 70, a forward flange 72 interconnected with the body 70, and an aft flange 76 interconnected with the body 70 as shown in FIG. 3. The forward flange 72 includes a pair of opposing surfaces 73, 74 that extend outwardly in the radial direction from the body 70. Similarly, the aft flange 76 includes a pair of opposing surfaces 77, 78 that extend outwardly in the radial direction from the body 70. The forward and aft flanges 72, 76 cooperate to define a passage 80 therebetween. In other embodiments, the blade track segment 35 may include more or less than the two flanges 72, 76. The apertures 48 of each blade track segment 35 extend through the surfaces 73, 74 of the forward flange 72 to open into the passage 80. The apertures 48 also extend through the surfaces 77, 78 of the aft flange 76 to open into the passage 80.

When the turbine shroud assembly 30 is assembled as shown in FIGS. 2 and 3, the forward and aft flanges 72, 76 of each blade track segment 35 are received in the forward and aft-most channels 67, 69 of each carrier segment 33, respectively. Each flange 72 is received in each channel 67 so that the slots 40, 50, 52 extending through the legs 61, 62 are aligned with corresponding apertures 48 extending through each flange 72. Similarly, each flange 76 is received in each channel 69 so that the slots 40, 50, 52 extending through the legs 63, 64 are aligned with corresponding apertures 48 extending through each flange 76. The fasteners 36 are positioned in the slots 40, 50, 52 and the apertures 48 to extend from the surface 73 to the channel 68 through the legs 61, 62 and the forward flange 72 when the segments 33, 35 are coupled together. Additionally, the fasteners 36 are positioned in the slots 40, 50, 52 and the apertures 48 to extend from the surface 78 to the channel 68 through the legs 63, 64 and the aft flange 76 when the segments 33, 35 are coupled together.

Figure 4:
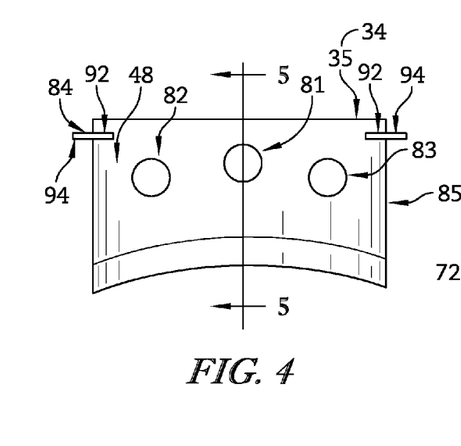
FIG. 4 is a front elevation view of one of the blade track segments of FIG. 3 showing a plurality of apertures formed in the one blade track segment.
Figure 5:
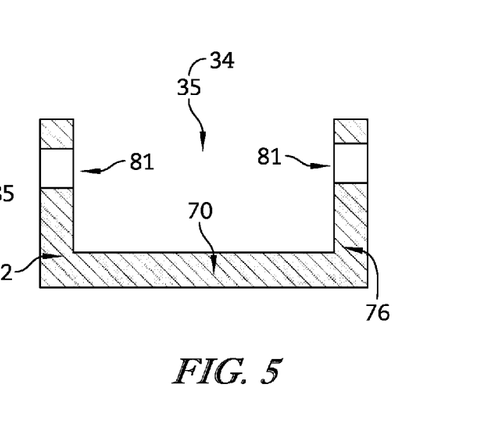
FIG. 5 is a sectional view of the one blade track segment of FIG. 4 taken at line 5-5 of FIG. 4.

Referring now to FIG. 4, the apertures 48 formed in each blade track segment 35 of the blade track 34 are shown in detail. The apertures 48 illustratively include apertures 81 substantially centered between opposing ends 84, 85 of the blade track segment 35. The apertures 48 also include apertures 82, 83 circumferentially spaced from the apertures 81. The apertures 81, 82, 83 are substantially equidistant from the engine axis 38 in the radial direction as shown in FIG. 4. In some embodiments, only apertures 82, 83 are equidistant from the axis 38.

Each blade track segment 35 of the blade track 34 illustratively includes a pair of notches 92 in which seals 94 are positioned as shown in FIG. 4. The seals 94 are circumferentially located between adjacent segments 35 of the blade track 34. The seals 94 block combustion products delivered to the turbine 18 from passing through gaps between adjacent segments 35 of the blade track 34, thereby contributing to lost performance within the engine 10. The seals 94 are illustratively made of a metallic material.

The seals 94 positioned between adjacent segments 35 of the blade track 34 may be used to direct cooling fluid to components of the turbine shroud assembly 30. For instance, adjacent seals 94 could extend relative to one another to create flow paths for directing cooling fluid to segments 35 of the blade track 34, or to the carrier 32. In this way, the seals 94 may be used to manage the thermal growth of the carrier 32, and thus the clearance between the blades 28 and the blade track 34 (i.e., as the guide pins 46 move within the guide slots 40).

The arrangements used to block combustion products delivered to the turbine 18 from passing through gaps between adjacent segments 35 of the blade track 34 may vary. In one example, a strip seal may be positioned in each notch 92 to block combustion products from passing through gaps between adjacent segments 35. In another example, a rod seal or an omega seal may be positioned between adjacent segments 35 of the blade track 34 to block combustion products from passing through gaps between segments 35. In yet another example, each of a plurality of seals may be arranged to engage aft surfaces of adjacent segments 35 to block combustion products from passing through gaps between segments 35. In another example still, a single seal may be arranged to engage aft surfaces of the segments 35 to block combustion products from passing through gaps between segments 35.

Figure 6:
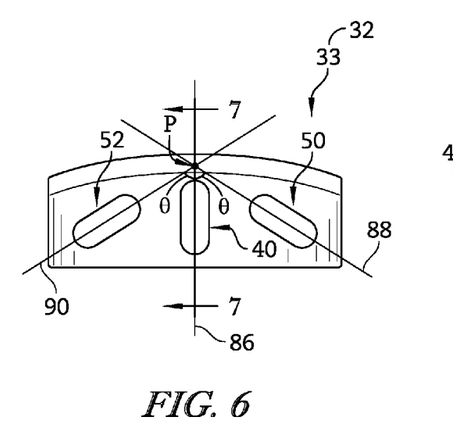
FIG. 6 is a front elevation view of one of the carrier segments of FIG. 3 showing a plurality of slots formed in the one carrier segment in a first arrangement.

Referring now to FIG. 6, the slots 40, 50, 52 of one of the carrier segments 33 of the carrier 32 are shown in detail. Each of the guide slots 40 extends substantially only in the radial direction along a guide axis 86 perpendicular to the engine axis 38. Each of the first mover slots 50 is circumferentially spaced clockwise from a corresponding guide slot 40 and extends along a first mover axis 88. Each of the second mover slots 52 is circumferentially spaced counter-clockwise from a corresponding guide slot 40 and extends along a second mover axis 90. The first mover axis 88 and the second mover axis 90 illustratively intersect at a point P arranged radially outward of each guide slot 40 as shown in FIG. 6. The first mover axis 88 and the second mover axis 90 are each illustratively arranged at an angle $\Theta$ to the guide axis 86 as shown in FIG. 6.

The first and second mover slots 50, 52 are illustratively substantially equidistant from each of the guide slots 40 as shown in FIG. 6. Each of the carrier segments 33 is illustratively symmetrical about the guide axes 86, and therefore the guide slots 40, of each segment 33 as shown in FIG. 6.

Figure 7:
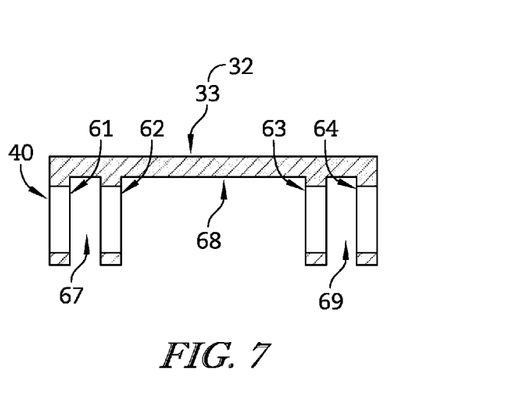
FIG. 7 is a sectional view of the one carrier segment of FIG. 6 taken at line 7-7 of FIG. 6.

Referring now to FIG. 7, a sectional view of each carrier segment 33 about a line 7-7 of FIG. 6 is shown. As indicated above, the guide slots 40 extend through the legs 61, 62 to open into the forward-most channel 67 and the channel 68, and also through the legs 63, 64 to open into the aft-most channel 69 and the channel 68.

Figure 8:
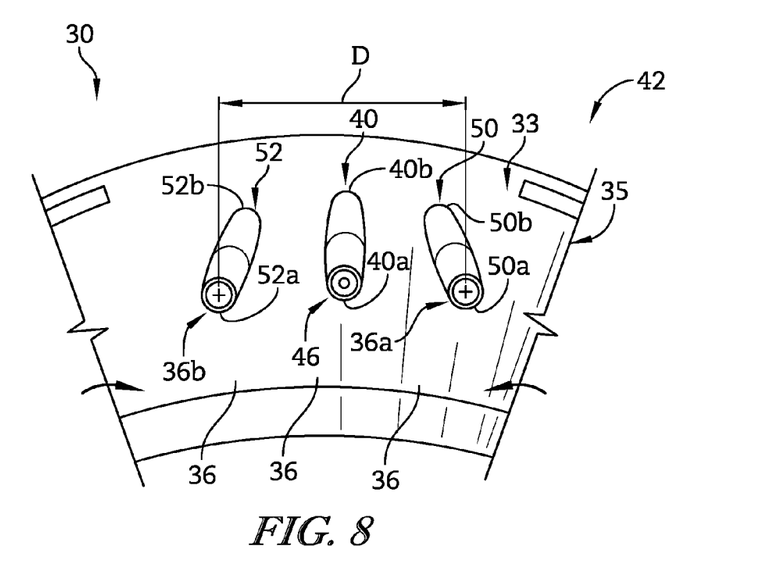
FIG. 8 is a front elevation view of the portion of the turbine shroud shown in FIG. 3 showing the blade track in a radially-inward position in which the blade track has a first inner diameter.
Figure 9:
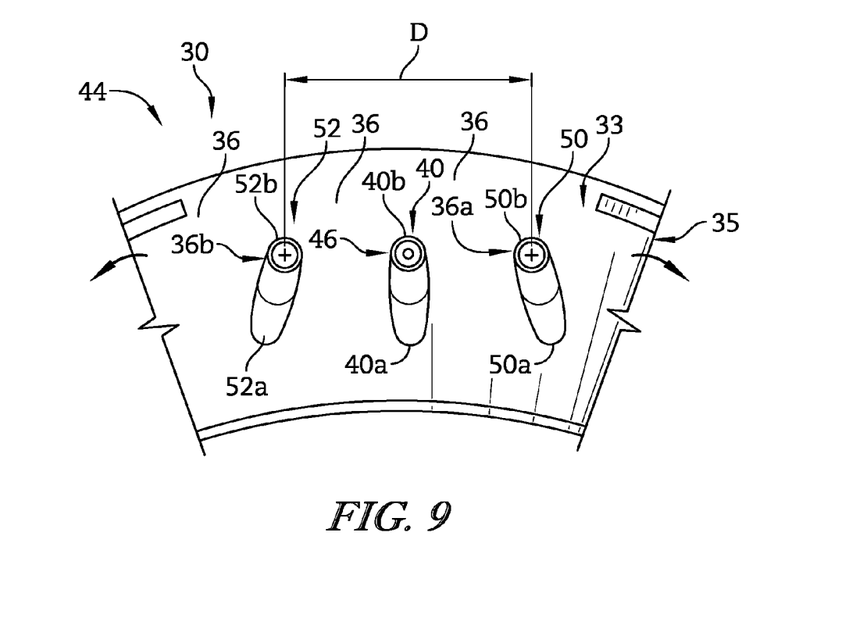
FIG. 9 is a view similar to FIG. 8 showing the blade track in a radially-outward position in which the blade track has a second inner diameter larger than the first inner diameter of FIG. 8.

Referring now to FIGS. 8-9, a portion of the turbine shroud assembly 30 is shown during operation of the gas turbine engine 10. Each carrier segment 33 is coupled to each blade track segment 35 via the fasteners 36 as discussed above. One guide pin 46 is positioned in each guide slot 40 and each aperture 81 to extend from the forward-most surface 56 through the legs 61, 62 and the forward flange 72 as discussed above. One fastener 36, also referred to herein as a first mover pin 36a, is positioned in each first mover slot 50 and each aperture 83 to extend from the forward-most surface 56 through the legs 61, 62 and the forward flange 72 as discussed above. Another fastener 36, also referred to herein as a second mover pin 36b, is positioned in each second mover slot 52 and each aperture 82 to extend from the forward-most surface 56 through the legs 61, 62 and the forward flange 72 as discussed above.

The guide pins 46, the first mover pins 36a, and the second mover pins 36b move together within their respective slots 40, 50, 52 in response to expansion and contraction of the carrier 32 during operation of the engine 10 as shown in FIGS. 8-9. Movement of the pins 46, 36a, 36b within their respective slots 40, 50, 52 causes the segments 35 of the blade track 34 to move inwardly and outwardly in the radial direction between the positions 42, 44 to adjust the inner diameter of the blade track 34.

To facilitate movement of the pins 46, 36a, 36b within their respective slots 40, 50, 52, a coating may be applied to surfaces of each carrier segment 33 engaged by the pins 46, 36a, 36b. Alternatively, or in addition to the coating applied to the surfaces of each carrier segment 33 engaged by the pins 46, 36a, 36b, the coating may be applied to the pins 46, 36a, 36b. In other embodiments, a bushing may be positioned between each of the pins 46, 36a, 36b and surfaces of each carrier segment 33 engaged by the pins 46, 36a, 36b to facilitate movement of the pins 46, 36a, 36b within their respective slots 40, 50, 52. In other embodiments still, other lubricants or bearings may be used to facilitate movement of the pins 46, 36a, 36b within their respective slots 40, 50, 52.

Each guide pin 46 is positioned in each guide slot 40 to substantially fix the circumferential position of each blade track segment 35 relative to each carrier segment 33 about the engine axis 38 as shown in FIGS. 8-9. Each guide slot 40 is sized to permit movement of the guide pin 46 positioned therein along the guide axis 86. Movement of the guide pin 46 along the guide axis 86 of each guide slot 40 allows each blade track segment 35 to move relative to each carrier segment 33 in the radial direction between the positions 42, 44. As the guide pins 46 move along the guide axes 86, the first mover pins 36a and the second mover pins 36b move along the axes 88, 90, respectively, so that the mover pins 36a, 36b are equidistant from the guide pins 46.

Movement of the first mover pins 36a and the second mover pins 36b within their respective guide slots 50, 52 facilitates the distribution of loads from each blade track segment 35 to each carrier segment 33 through the pins 36a, 36b. Specifically, during operation of the gas turbine engine 10, loads (e.g., radial loads) experienced by the blade track 34 are reacted to the carrier 32 through the pins 36a, 36b. Because the guide slots 50, 52 are angled (i.e., the first and second mover axes 88, 90 extend at angles Θ to the guide axes 86), decreased loads are reacted from the blade track 34 to the carrier 32 through the first and second mover pins 36a, 36b. In this fashion, the stiffness of each joint formed by the coupling of the blade track segments 35 to the carrier segments 33 via the fasteners 36 is lowered. As a result, engagement between the blade track 34 and the carrier 32 is maintained in an improved fashion during operation of the gas turbine engine 10.

Tip clearance between the blades 28 and the blade track 34 may be controlled passively or actively by using a set of three slots, i.e., the central pin slot 40 flanked by two angled slots 50, 52 in opposite directions, in legs 61, 62, 63, 64 of a metal carrier segment 33. As the carrier 32 grows thermally more than the ceramic matrix composite (CMC) segment 35, the pins 46, 36a, 36b may move along the slots 40, 50, 52, opening or closing the tip clearance. The blade track segment 35 may have a flowpath surface and two parallel flanges 72, 76. The blade track segment 35 may be supported relative to the carrier segment 33 by three pins 46, 36a, 36b in each flange 72, 76.

The illustrated embodiment for a CMC segment 35 may be to have the pins 46, 36a, 36b fit snugly in the apertures 48 in the CMC flanges 72, 76, as suggested in FIGS. 3-4 (note that pin clearance may be sized to accommodate relative thermal growth, allowable stresses, manufacturing tolerances, etc.). The pins 46, 36a, 36b may be supported by slots 40, 50, 52 in the carrier legs 61, 62, 63, 64, transferring loads from the flanges 72, 76 of the CMC segment 35 to the pins 46, 36a, 36b to the carrier legs 61, 62, 63, 64.

In the illustrated embodiment, the two outside slots 50, 52 in the metal carrier legs 61, 62, 63, 64 may be wider than the pins 46, 36a, 36b, as suggested in FIG. 3. The additional width may allow for motion along the slot axes 88, 90. The slot axes 88, 90 of the outside slots 50, 52 may be at an angle relative to a tangential reference surface (note that since these parts are mounted on a radius relative to the axis 38, the curvature in the flowpath surface may be accounted for within the outside slots 50, 52). The outside slot axes 88, 90 may be angled in opposite directions as shown in FIGS. 3 and 6. The center slots 40 may be taller than the pins 46 as shown in FIGS. 8-9. The additional height may allow the pins 46 to move in and out in the radial direction relative to the axis 38.

The central pins 46 may locate the segment 35 in the circumferential direction and force the outside pins 36a, 36b to move an equal distance from the axes 86 of the slots 40 (assuming symmetrical thermal growth about the axes 86). The two outer pins 36a, 36b may ride in the slots 50, 52. The farther apart they are (due to thermal growth), the pins 36a, 36b may slide closer to the outside ends 50b, 52b of the slots 50, 52, forcing the segment 35 outward in radius (compared to the axis 38) depending on the angle of the slots 50, 52, as shown in FIG. 9. The closer together the pins 36a, 36b are, they may slide closer to the inside ends 50a, 52a of the slots 50, 52, forcing the segment 35 inward in radius depending on the angle of the slots 50, 52, as shown in FIG. 8. FIGS. 3, 6, and 8-9 illustrate carriers 32 with the outside slots 50, 52 angled in opposite directions, thereby resulting in opposite radial movement of the segment 35 for a given amount of relative thermal growth between the pins 46, 36a, 36b. The gain between the distance between the pins 46, 36a, 36b and the amount of movement radially inward or outward may be controlled by the angle of the slots 50, 52.

Because the pins 46 force the outside pins 36a, 36b to be an equal distance from the slot axes 86, the pins 46 control the orientation of the segment 35. Without the pins 46, the segment 35 may move to one side or the other, with one side up in one of the slots 50, 52 and the other side down in the other of the slots 50, 52. This would not be acceptable from an engine standpoint since the tip clearance would be gone on one side and excessively large on the other.

The central pins 46 may ride in the radial slots 40 to allow the segment 35 to move in and out radially as the relative distance between the outside pins 36a, 36b changes. The main loads on the segment 35 are radial and are transferred to the carrier segment 33 via the two outer pins 36a, 36b. Because CMC is a very stiff (high modulus of elasticity) material, it tends not to distribute loads well at contract points. The angle of the slot may provide additional compliance to the contact between the segment 35 and the carrier segment 33, improving the load distribution between the pins 36a, 36b.

In the exemplary embodiment, the carrier 32 may be a full hoop, cross-keyed in place relative to the case 20. The cross-keys may ensure the carrier 32 remains centered about the engine axis 38 while allowing the carrier 32 to thermally grow and shrink relative to the case 20.

Turbine blade tip clearance may be controlled according to the concepts disclosed herein. The angle of the slots 50, 52 may be set by determining the optimum angle for the given engine 10. The turbine blade tip clearance control (TCC) system may be passive. In this case, the thermal growth difference between the carrier segment 33 and the CMC segment 35 may be compared against the excursions of the turbine blade tips 29. The angles of the slots 50, 52 may then be selected that best manage tip clearance (e.g., minimizing tip clearance at key operating points while avoiding tip rubs). The tip clearance control methodology disclosed herein may be used anywhere in a gas turbine engine, not just in the turbine section over turbine blades. The methodology may be used over compressor blades or even fan blades.

The motion of the pins 36a, 36b in the slots 50, 52 may also be considered when determining the angle of the slots 50, 52. The shallower the angle, the greater the wedge effect may be, making it easier for the pins 36a, 36b to slide, but the tip clearance gain may be less, The angle may be chosen to optimize all of these factors.

The carrier 32 may be thermally managed by the use of air flow impinging, flowing across, flowing through, or all of the above. By managing the air on the carrier 32, the temperature of the carrier 32 may be controlled, thereby controlling tip clearance.

The slots (e.g., slots 40, 50, 52) may be formed in the carrier segment 33, since in the preferred embodiment, the metal on metal wear coupling typically has less wear than a CMC to metal coupling. The slot axes (e.g., 86, 88, 90) may be any shape. The slot axes could be straight as shown in FIG. 6. The slot axes may be curved to accommodate the curvature of the flowpath surface such that the change in flowpath radius is linear as the pins move apart. The slot axes may also be curved in such a way to create different gains as the pins 46, 36a, 36b move along the slots 40, 50, 52 in order to fine tune the tip control system. This may be especially useful for a passive TCC system. Another reason to fine tune the slot angle along the slot axis would be to minimize wear in regions of high temperature or high loads.

FIGS. 3 and 8-9 show a system with three pins 46, 36a, 36b: one (46) in a vertical slot 40 and two (36a, 36b) in outside angled slots 50, 52. An alternate embodiment may have a single vertical slot, but more than two angled slots such that the radial load may be shared by more than two pins. This embodiment may be useful in increasing the segment width, thereby reducing the number of gaps between segments (and thereby improving specific fuel consumption by reducing the amount of leakage).

The pins 46, 36a, 36b may be round. The pins may instead be shaped in an oblong shape with flat sides or having a large radius of curvature (for lower contact stress). The pins may be shaped in one component but round in the other to allow rotation in the non-sliding pin to hole joint. Bushings, bearings, wear coatings, and/or lubricants may be used in the pinned joints to manage contact stresses, reduce wear, and/or reduce hysteresis.

Referring now to FIG. 8, the blade track segment 35 of the turbine shroud assembly 30 is shown in the radially-inward position 42 in which the blade track 34 has the first inner diameter. In response to the contraction of the carrier 32 and the carrier segments 33 during operation of the engine 10, the guide pins 46 have moved toward radially-inward ends 40a of the guide slots 40. As a result, the first mover pins 36a and the second mover pins 36b have moved toward radially-inward ends 50a and 52a of the first and second mover slots 50, 52, respectively. The first and second mover pins 36a and 36b are illustratively spaced a distance D from one another in the radially-inward position 42 shown in FIG. 8.

Referring now to FIG. 9, the blade track segment 35 of the turbine shroud assembly 30 is shown in the radially-outward position 44 in which the blade track 34 has the second inner diameter larger than the first inner diameter. In response to the expansion of the carrier 32 and the carrier segments 33 during operation of the engine 10, the guide pins 46 have moved toward radially-outward ends 40b of the guide slots 40 opposite the ends 40a. As a result, the first mover pins 36a have moved toward radially-outward ends 50b of the first mover slots 50 opposite the ends 50a, and the second mover pins 36b have moved toward radially-outward ends 52b of the second mover slots 52 opposite the ends 52a. The first and second mover pins 36a and 36b are illustratively spaced the same distance D from one another in the radially-outward position 44 of FIG. 9 as in the radially-inward position 42 of FIG. 8.

A method of coupling the carrier 32 to the blade track 34 is suggested in FIGS. 1-9. The method may include arranging the carrier 32 concentric with the blade track 34 about the engine axis 38 so that the carrier 32 extends around the axis 38 to surround the blade track 34. The method may also include coupling the carrier 32 to the blade track 34 to resist movement of the blade track 34 relative to the carrier 32 around the axis 38 and to allow movement of the blade track 34 relative to the carrier 32 in a radial direction relative to the axis 38.

Coupling the carrier 32 to the blade track 34 may include coupling at least one carrier segment 33 to at least one blade track segment 35 by inserting the guide pin 46 through one of the guide slots 40 formed in the at least one carrier segment 33 and one of the apertures 81 formed in the at least one blade track segment 35. Coupling the carrier 32 to the blade track 34 may also include coupling the at least one carrier segment 33 to the at least one blade track segment 35 by inserting the fastener 36a through one of the first mover slots 50 formed in at least one carrier segment 33 and one of the apertures 83 formed in the at least one blade track segment 35. Coupling the carrier 32 to the blade track 34 may further include coupling the at least one carrier segment 33 to the at least one blade track segment 35 by inserting the fastener 36b through one of the second mover slots 52 formed in the at least one carrier segment 33 and one of the apertures 82 formed in the at least one blade track segment 35.

Referring again to FIGS. 1-9, to optimize the clearance between the tips 29 of the blades 28 and the blade track 34, a passive system may be used. For example, clearance between the tips 29 and the blade track 34 may be measured during operation of the engine 10 based on a desired schedule while accounting for any thermal growth differences between the carrier 32, the blade track 34, and the tips 29 of the blades 28. The measured clearance may be associated with a particular arrangement of the first and second mover slots 50, 52 relative to the guide slots 40. Specifically, the measured clearance may be associated with angles Θ at which the axes 88, 90 of the first and second mover slots 50, 52 extend, respectively, relative to the guide axes 86 of the guide slots 40 as shown in FIGS. 8-9. The angles Θ may be passively adjusted to optimize the clearance between the tips 29 of the blades 28 and the blade track 34.

To optimize the clearance between the tips 29 of the blades 28 and the blade track 34, an active system may be used rather than, or in addition to, the passive system discussed above. Specifically, the temperature of the carrier 32 may be controlled by a temperature control system (not shown) to cause expansion and contraction of the carrier 32. As the carrier 32 heats or cools it will expand and contract, causing each of the carrier segments 33 to change size. As the carrier segments 33 change size, the fasteners 36 move within the slots 40, 50, 52 so that the blade track segments 35 move between the positions 42, 44, thereby adjusting the inner diameter of the blade track 34. The temperature control system (not shown) may include a source of cooling air, one or more temperature sensors arranged to determine the temperature of the cooling air or the carrier 32, one or more flow control valves, and a controller coupled to the temperature sensors and flow control valves. The controller may be configured to adjust the inner diameter of the blade track 34 by controlling the cooling flow rate so that the carrier 32 is maintained at a selected temperature. The selected temperature can be provided in a lookup table or calculated based on the expected diameter of the first stage turbine wheel assembly 24.

Other active systems may be used to optimize the clearance between the blades 28 and the blade track 34. In one example, rather than using temperature sensors to monitor the temperature of the carrier 32, the clearance between the blades 28 and the blade track 34 may be monitored via probes or position sensors arranged on the carrier 32. In this way, the clearance measured by the probes/sensors may be used to adjust the flow of cooling air, and thereby direct the adjustment of the blade tip clearance during operation of the engine 10.

Figure 10:
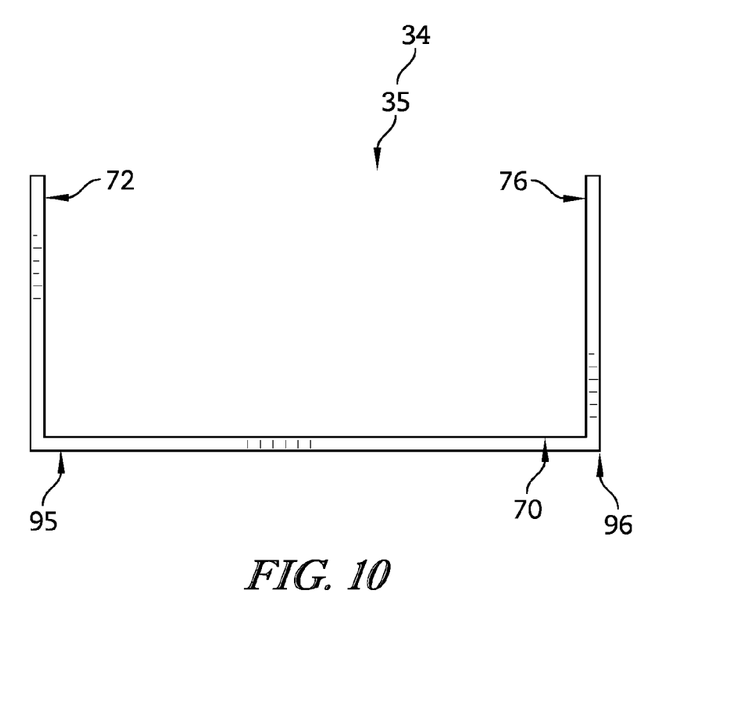
FIG. 10 is a simplified sectional view of a portion of the blade track of FIG. 3 showing one arrangement of a pair of flanges of the blade track portion relative to a body of the blade track portion.

Referring now to FIG. 10, a simplified sectional view of one of the blade track segments 35 of the blade track 34 is shown. In the illustrative arrangement, the forward and aft flanges 72, 76 are arranged adjacent opposite ends 95, 96 of the body 70, respectively. No portion of the body 70 extends parallel to the engine axis 38 beyond the forward and aft flanges 72, 76 as shown in FIG. 10.

Figure 11:
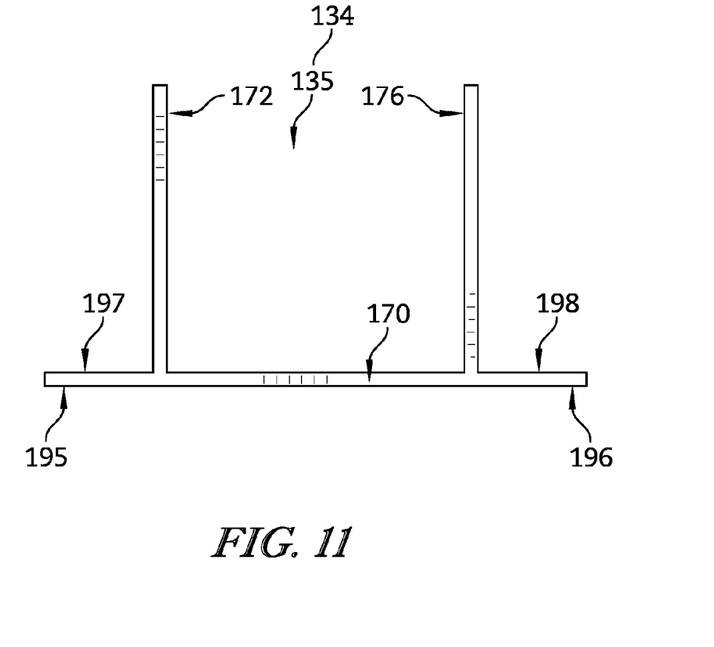
FIG. 11 is a view similar to FIG. 10 of an alternative blade track for use in a turbine shroud showing another arrangement of a pair of flanges of the blade track portion relative to a body of the blade track portion.

Referring now to FIG. 11, a simplified sectional view of a blade track segment 135 of a blade track 134 included in a turbine shroud 130 is shown. The turbine shroud 130 is configured for use in gas turbine engine 110 and is substantially similar to the turbine shroud assembly 30 shown in FIGS. 2-3 and described herein. In the illustrative arrangement of FIG. 11, the forward flange 172 of the blade track segment 135 is arranged aft of the end 195 of the body 170 along the engine axis 138. The aft flange 176 of the blade track segment 135 is illustratively arranged forward of the end 196 of the body 170 along the engine axis 138. As such, a portion 197 of the body 170 adjacent the end 195 extends parallel to the engine axis 138 beyond the forward flange 172, and a portion 198 of the body 170 adjacent the end 196 extends parallel to the engine axis 138 beyond the aft flange 176. In this way, the flanges 172, 176 are positioned inboard of the ends 195, 196 of the body 170.

Figure 12:
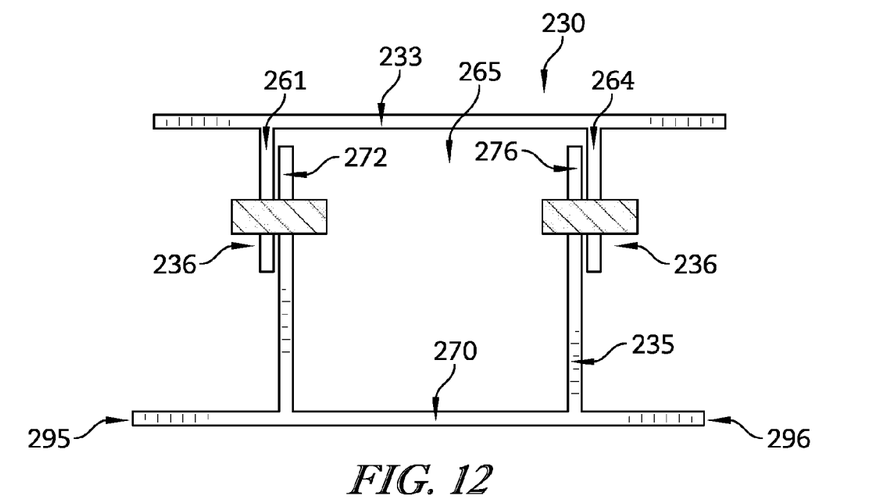
FIG. 12 is a simplified sectional view of a portion of an alternative turbine shroud showing one assembly arrangement in which a carrier of the turbine shroud is coupled to a blade track of the turbine shroud to support the blade track.

Referring now to FIG. 12, a simplified sectional view of a portion of a turbine shroud 230 is shown. The turbine shroud 230 is configured for use in gas turbine engine 210 and is substantially similar to the turbine shrouds 30, 130 shown in FIGS. 2-3 and FIG. 11, respectively, and described herein. In the illustrative arrangement of FIG. 12, the flanges 272, 276 of the blade track segment 235 are positioned inboard of the ends 295, 296 of the body 270 similar to the blade track segment 135 shown in FIG. 11. Unlike the carrier segment 33 of the turbine shroud assembly 30, the carrier segment 233 illustratively includes only two legs 261, 264 defining a single channel 265 therebetween as shown in FIG. 12. The slots (not shown) formed in the carrier segment 233 therefore extend through only the two legs 261, 264 to open into the channel 265.

In the assembly arrangement of the turbine shroud 230 shown in FIG. 12, the flanges 272, 276 of the blade track segment 235 are received in the channel 265 of the carrier segment 233. Fasteners 236 are used to couple the carrier segment 233 to the blade track segment 235 so that the carrier segment 233 supports the blade track segment 235.

Unlike the turbine shroud assembly 30, each of the fasteners 236 is supported by one of the flanges 272, 276 of the blade track segment 235 and only one of the legs 261, 264 of the carrier segment 233. Specifically, only one end of each of the fasteners 236 is supported by one of the flanges 272, 276 and one of the legs 261, 264. As such, the fasteners 236 are cantilevered in the assembly arrangement shown in FIG. 12.

Figure 13:
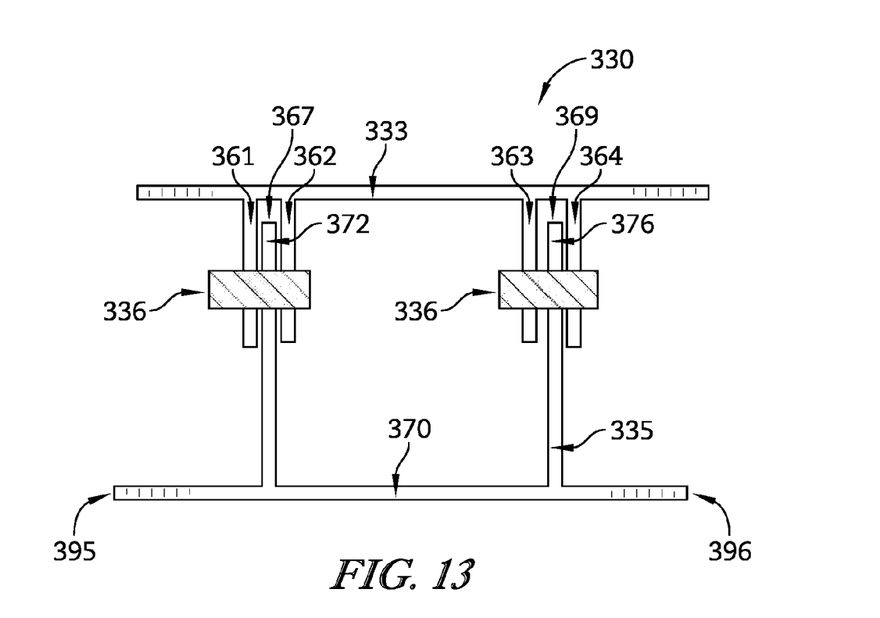
FIG. 13 is a view similar to FIG. 12 of another alternative turbine shroud showing another assembly arrangement in which the carrier is coupled to the blade track to support the blade track.

Referring now to FIG. 13, a simplified sectional view of a portion of a turbine shroud 330 is shown. The turbine shroud 330 is configured for use in gas turbine engine 310 and is substantially similar to the turbine shroud 230 shown in FIG. 12 and described herein. In illustrative arrangement of FIG. 13, the flanges 372, 376 of the blade track segment 335 are positioned inboard of the ends 395, 396 of the body 370 similar to the blade track segment 235 shown in FIG. 12. Unlike the carrier segment 233 of the turbine shroud 230, the carrier segment 333 includes four legs 361, 362, 363, 364 defining three channels 367, 368, 369 therebetween as shown in FIG. 13.

In the assembly arrangement of the turbine shroud 330 shown in FIG. 13, the flanges 372, 376 of the blade track segment 335 are received in the channels 367, 369, respectively, of the carrier segment 333. Fasteners 336 are used to couple the carrier segment 333 to the blade track segment 335 so that the carrier segment 333 supports the blade track segment 335.

Unlike the turbine shroud 230, each of the fasteners 336 is supported by one of the flanges 372, 376 of the blade track segment 335 and two of the legs 361, 362, 363, 364 of the carrier segment 333. Specifically, the ends of each of the fasteners 336 are supported by one of the flanges 372, 376 and two of the legs 361, 362, 363, 364. As such, the fasteners 336 are supported at both ends in the assembly arrangement of FIG. 13. In that way, the turbine shroud 330 is similar to the turbine shroud assembly 30.

Figure 14:
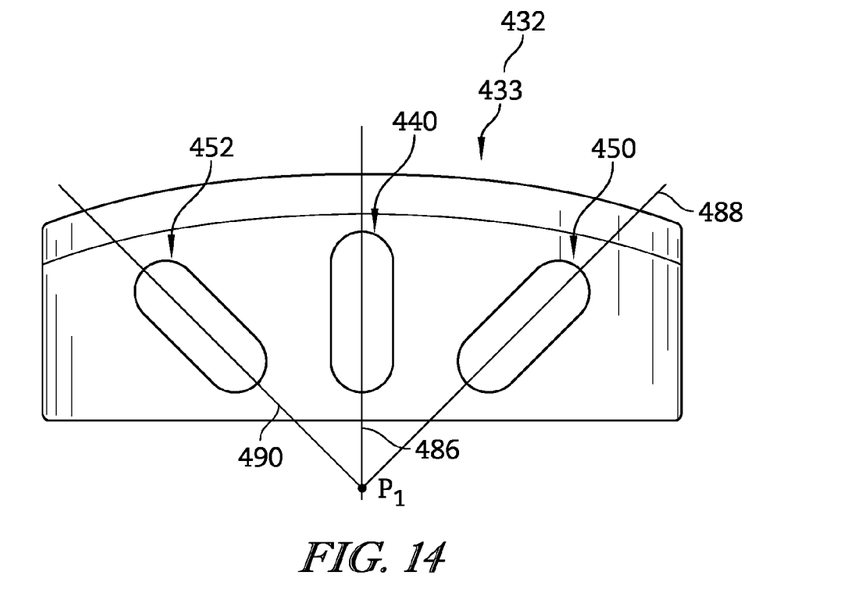
FIG. 14 is a view similar to FIG. 6 showing a second arrangement of slots formed in one carrier segment of a carrier adapted for use in a turbine shroud.

Referring now to FIG. 14, a carrier segment 433 of a carrier 432 included in a turbine shroud 430 is shown in detail. The turbine shroud 430 is configured for use in gas turbine engine 410 and is substantially similar to the turbine shroud assembly 30 shown in FIGS. 2-3 and described herein. In the illustrative arrangement of FIG. 14, each of the first mover slots 450 extends along the first mover axis 488, and each of the second mover slots 452 extends along the second mover axis 490. Unlike the carrier segment 33, the first and second mover axes 488, 490 of the carrier segment 433 intersect at a point $P_1$ arranged radially inward of each of the guide slots 440.

Figure 15:
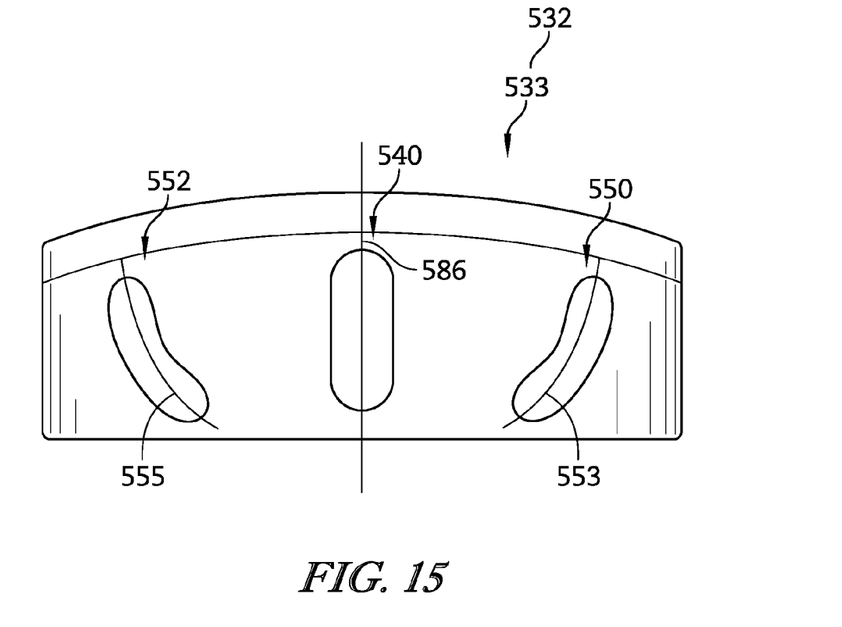
FIG. 15 is a view similar to FIGS. 6 and 14 showing a third arrangement of slots formed in one carrier segment of a carrier adapted for use in a turbine shroud.

Referring now to FIG. 15, a carrier segment 533 of a carrier 532 included in a turbine shroud 530 is shown in detail. The turbine shroud 530 is configured for use in gas turbine engine 510 and is substantially similar to the turbine shrouds 30, 430 shown in FIGS. 2-3 and FIG. 14, respectively, and described herein. Unlike the carrier segments 33 and 433, the first and second mover slots 550, 552 of the carrier segment 533 extend along first and second arcs 553, 555, respectively (also referred to herein as first and second cam paths 553, 555). When viewed about the guide axes 586 of the guide slots 540, the first and second arcs 553, 555 mirror one another.

The foregoing example has been illustrated and described with reference to an aerospace gas turbine engine; however, the teachings are also applicable for use in other types of turbine applications. For example, energy turbines, marine turbines, pumping turbines, and other types of turbines may incorporate the teachings of this disclosure without departure from the scope of the present description.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for a gas turbine engine, the turbine shroud assembly comprising
    a carrier configured to change size in response to a change in temperature, the carrier arranged around an engine axis to form a ring, the carrier formed to include a plurality of guide slots extending perpendicular to the engine axis,
    a blade track concentric with the carrier made of a plurality of segments, the blade track movable between a radially-inward position having a first inner diameter and a radially-outward position having a second inner diameter larger than the first inner diameter, and
    a plurality of guide pins positioned in the guide slots for movement therein relative to the carrier, attached to the segments of the blade track for movement with the blade track relative to the carrier, and configured to couple the carrier to the blade track, wherein the guide pins are movable within the guide slots so that the segments of the blade track each move substantially inwardly and outwardly in a radial direction relative to the engine axis as the blade track moves between the radially-inward position and the radially-outward position in response to movement of the guide pins within the guide slots.

2. The turbine shroud assembly of claim 1, wherein the guide slots extend substantially only in the radial direction.

3. The turbine shroud assembly of claim 1, wherein (i) the plurality of segments of the blade track comprise a plurality of segments formed from ceramic matrix composite material, and (ii) the carrier comprises a plurality of metallic carrier segments.

4. A turbine shroud assembly for a gas turbine engine, the turbine shroud assembly comprising
    a carrier configured to change size in response to a change in temperature, the carrier arranged around an engine axis to form a ring, the carrier formed to include a plurality of guide slots extending perpendicular to the engine axis,
    a blade track concentric with the carrier made of a plurality of segments, the blade track movable between a radially-inward position having a first inner diameter and a radially-outward position having a second inner diameter larger than the first inner diameter, and
    a plurality of guide pins positioned in the guide slots and attached to the segments of the blade track to couple the carrier to the blade track, the guide pins movable within the guide slots so that the segments of the blade track each move substantially inwardly and outwardly in a radial direction relative to the engine axis as the blade track moves between the radially-inward position and the radially-outward position, wherein the carrier is further formed to include (i) a plurality of first mover slots each circumferentially spaced clockwise from corresponding adjacent guide slots and (ii) a plurality of second mover slots each circumferentially spaced counterclockwise from corresponding adjacent guide slots.

5. The turbine shroud assembly of claim 4, wherein the carrier includes a plurality of carrier segments, and at least one of the plurality of carrier segments is formed to include one of the plurality of guide slots, one of the plurality of first mover slots, one of the plurality of second mover slots.

6. The turbine shroud assembly of claim 4, wherein (i) each of the first mover slots extends along a first mover axis, (ii) each of the second mover slots extends along a second mover axis, and (iii) the first mover axis and the second mover axis intersect at a point arranged radially outward of the guide slots.

7. The turbine shroud assembly of claim 4, wherein (i) each of the first mover slots extends along a first mover axis, (ii) each of the second mover slots extends along a second mover axis, and (iii) the first mover axis and the second mover axis intersect at a point arranged radially inward of the guide slots.

8. The turbine shroud assembly of claim 4, wherein (i) each of the first mover slots extends along a first cam path, (ii) each of the second mover slots extends along a second cam path, and (iii) the first cam path mirrors a corresponding second cam path when viewed about a corresponding guide axis.

9. The turbine shroud assembly of claim 4, further comprising (i) a plurality of first mover pins positioned in the first mover slots and attached to segments of the blade track to couple the carrier to the segments of the blade track and (ii) a plurality of second mover pins positioned in the second mover slots and attached to the segments of the blade track to couple the carrier to the segments of the blade track, wherein the first and second mover pins move together within their respective mover slots in response to expansion and contraction of the carrier to move the segments of the blade track inwardly and outwardly in the radial direction.

10. The turbine shroud assembly of claim 9, wherein corresponding first and second mover pins are equidistant from a corresponding guide pin as corresponding first and second mover pins move within their respective mover slots.

11. A turbine shroud assembly for a gas turbine engine, the turbine shroud assembly comprising
    a carrier configured to change size in response to a change in temperature, the carrier arranged around an engine axis to form a ring, the carrier including a plurality of carrier segments each having (i) a guide slot extending perpendicular to the engine axis, (ii) a first mover slot circumferentially spaced a first distance from the guide slot, and (iii) a second mover slot circumferentially spaced a second distance equal to the first distance from the guide slot,
    a blade track concentric with the carrier made of a plurality of segments, and
    a plurality of fasteners attached to the segments of the blade track and the carrier segments to couple the segments of the blade track to the carrier segments, one of the plurality of fasteners being positioned in each of the guide slot, the first mover slot, and the second mover slot of each carrier segment, the fasteners positioned in the respective slots of each carrier segment being movable together in their respective slots in response to a change in size of the carrier to cause the plurality of segments of the blade track to move inwardly and outwardly in a radial direction relative to the engine axis.

12. The turbine shroud assembly of claim 11, wherein (i) the first mover slot is circumferentially spaced clockwise from the guide slot of each carrier segment, and (ii) the second mover slot is circumferentially spaced counterclockwise from the guide slot of each carrier segment.

13. The turbine shroud assembly of claim 12, wherein (i) each of the first mover slots extends along a first mover axis, (ii) each of the second mover slots extends along a second mover axis, and (iii) the first mover axis and the second mover axis intersect at a point arranged radially outward of each of the guide slots.

14. The turbine shroud assembly of claim 12, wherein (i) each of the first mover slots extends along a first mover axis, (ii) each of the second mover slots extends along a second mover axis, and (iii) the first mover axis and the second mover axis intersect at a point arranged radially inward of each of the guide slots.

15. The turbine shroud assembly of claim 12, wherein (i) each of the first mover slots extends along a first arc, (ii) each of the second mover slots extends along a second arc, and (iii) the first arc mirrors the second arc when viewed about a guide axis defined by the guide slot of each carrier segment.

16. The turbine shroud assembly of claim 11, wherein each of the carrier segments is symmetrical about a guide axis defined by the guide slot.

17. The turbine shroud assembly of claim 11, wherein (i) the plurality of segments of the blade track comprise a plurality of segments formed from ceramic matrix composite material, and (ii) the plurality of carrier segments of the carrier comprise a plurality of metallic carrier segments.

18. A method of coupling a carrier of a turbine shroud assembly of a gas turbine engine to a blade track of the turbine shroud assembly, the method comprising
arranging the carrier concentric with the blade track about an engine axis of the as turbine engine so that the carrier extends around the engine axis to surround the blade track, and
coupling the carrier to the blade track to (i) resist movement of the blade track relative to the carrier around the engine axis and (ii) allow movement of the blade track relative to the carrier in a radial direction relative to the engine axis in response to a change in temperature of the carrier,
wherein (i) at least one carrier segment of the carrier is formed to include a guide slot extending substantially only in the radial direction, (ii) at least one blade track segment of the blade track is formed to include an aperture, and (iii) coupling the carrier to the blade track comprises coupling the at least one carrier segment of the carrier to the at least one blade track segment of the blade track by inserting a fastener through the guide slot and the aperture.

19. The method of claim 18, wherein (i) the at least one carrier segment of the carrier is formed to include a first mover slot circumferentially spaced clockwise from the guide slot and a second mover slot circumferentially spaced counterclockwise from the guide slot so that the at least one carrier segment is symmetrical about the guide slot, (ii) the at least one blade track segment is formed to include a second aperture and a third aperture, and (iii) coupling the carrier to the blade track comprises coupling the at least one carrier segment of the carrier to the at least one blade track segment of the blade track by inserting fasteners through the first mover slot and the second aperture and also through the second mover slot and the third aperture.

\* \* \* \* \*